US006630637B1

(12) United States Patent
Ward et al.

(10) Patent No.: US 6,630,637 B1
(45) Date of Patent: Oct. 7, 2003

(54) AC DISCONNECT SWITCH

(75) Inventors: Charles Barry Ward, Alpharetta, GA (US); Scott Clinn Ellyson, Decatur, GA (US); Jeff Sweeney, Atlanta, GA (US)

(73) Assignee: Diversitech Corporation, Decatur, GA (US)

( * ) Notice: Subject to any disclaimer, the term of this patent is extended or adjusted under 35 U.S.C. 154(b) by 0 days.

(21) Appl. No.: 10/061,663

(22) Filed: Feb. 1, 2002

(51) Int. Cl.[7] .................................................. H01M 3/00
(52) U.S. Cl. ...................................................... 200/17 R
(58) Field of Search ............................... 200/17 R, 293, 200/296, 297, 43.05, 43.22

(56) References Cited

U.S. PATENT DOCUMENTS 6,242,697 B1 * 6/2001 Gerken et al. ............ 174/65 R
6,337,447 B1 * 1/2002 Wise et al. ............... 200/17 R

* cited by examiner

*Primary Examiner*—Karl D. Easthom
*Assistant Examiner*—M. Fishman
(74) *Attorney, Agent, or Firm*—Smith, Gambrell & Russell, LLP

(57) ABSTRACT

An AC disconnect switch having a first embodiment with an enclosure with portions of its side walls removed for easier access. The first embodiment of the AC disconnect switch also has a cover that is hinged at the top of the case and opens at an angle greater than 180 degrees to further enhance access. In a second embodiment, the cover is reversibly hinged on the side of the case of the enclosure for enhance access. Both embodiments of the AC disconnect switch have the terminal lugs with roughened surfaces on the terminal block aligned in the transverse direction of the enclosure to accommodate precut and prestripped wiring harnesses. The terminal block is mounted to the case by a tab arrangement which requires only a single screw. The AC disconnect switch also has a locking mechanism with retractable hasp to minimize shipping volume.

25 Claims, 11 Drawing Sheets

Fig_4
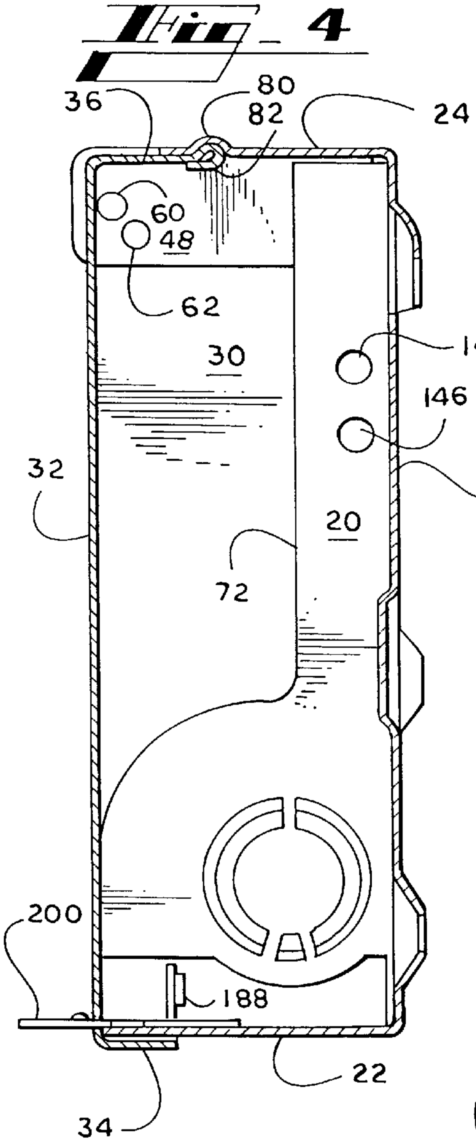
Fig_8
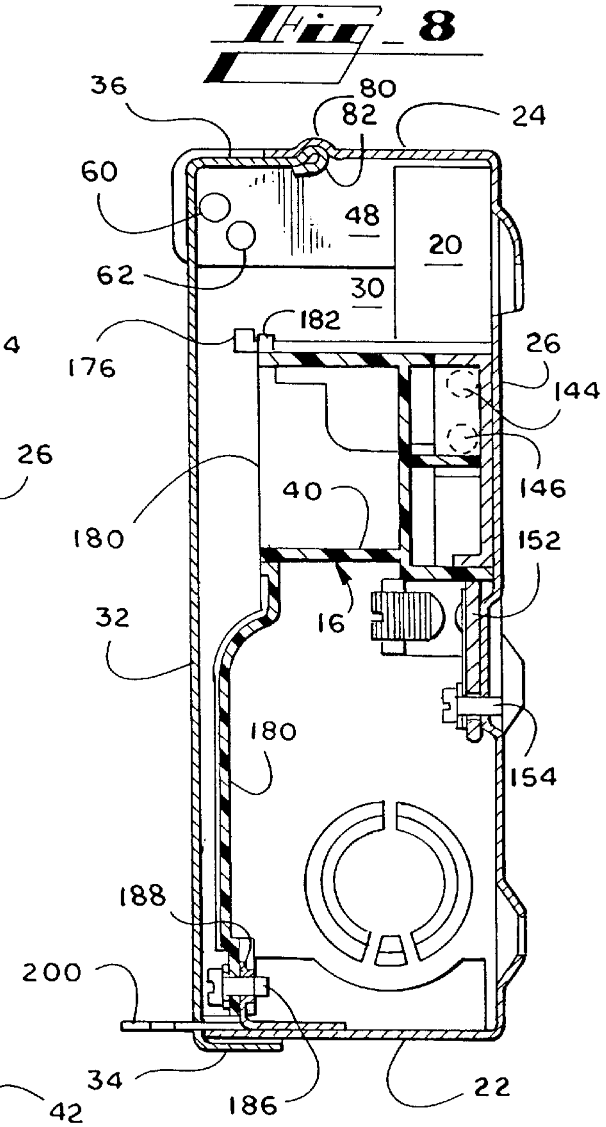
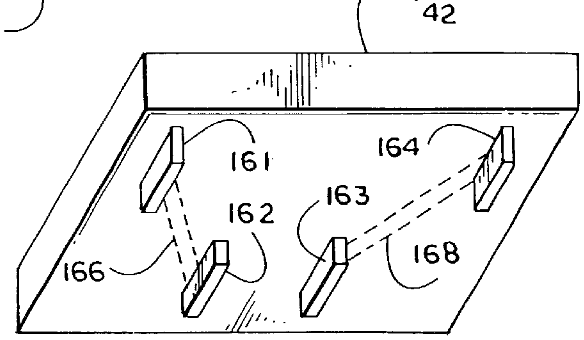
Fig_7

AC DISCONNECT SWITCH

FIELD OF THE INVENTION

This invention relates to an AC disconnect switch, and more specifically relates to an AC disconnect switch having an enclosure with an internal terminal block assembly that is easily accessible for installation of wiring, that is adaptable to installation in inaccessible locations, and that has an improved locking mechanism.

BACKGROUND OF THE INVENTION

AC disconnect switches are well-known in the art and are often used for connecting AC current to and disconnecting AC current from air-conditioner compressors. Such AC disconnect switches operate between on and off conditions by inserting a pullout handle assembly into and removing the pullout handle assembly from a stationary terminal block assembly mounted within the enclosure of the AC disconnect switch. The pullout handle assembly has conductive blades which engage stationary stabs within the terminal block assembly to thereby complete an electric circuit. Such AC disconnect switches may or may not incorporate fuses within the pullout handle assembly.

Although AC disconnect switches come in a variety of mechanical designs, a typical design is shown in Miller et al. U.S. Pat. No. Re. 34,113. The disclosed AC disconnect switch includes an enclosure comprising a rectangular shaped case with a hinged cover. The cover is hinged on the top but may be hinged on the side. A plastic terminal block is mounted within the volume defined by the case. The terminal block includes terminal lugs to which wires may be connected. The terminal lugs in turn are electrically connected to female jaws or stabs within the terminal block. The female stabs are located within a receptacle formed in the terminal block. A pullout handle assembly is dimensioned to fit within the receptacle and includes knife blades which are electrically interconnected within the handle assembly. When the pullout handle assembly is inserted into the receptacle, the knife blades of the handle assembly engage the female stabs and thereby complete the circuit. An internal plastic shield covers the terminal lugs once installation of the wires has been completed.

Other AC disconnect devices are shown in Smith U.S. Pat. No. 2,581,308, Coley et al. U.S. Pat. No. 3,955,709, DiMarco et al. U.S. Pat. No. 4,233,482, Hibbert et al. U.S. Pat. No. 4,675,782, Hibbert et al. U.S. Pat. No. 4,794,211, Reichow et al. U.S. Pat. No. 5,272,297, and Kuki et al. U.S. Pat. No. 5,842,560.

The prior art AC disconnect switches have several shortcomings. The most consistent shortcoming of the prior art references is the relative inaccessibility of the terminal block within the case. In practice, AC disconnect switches are often mounted in locations where direct access may be limited. Therefore, it is important that the electrician wiring the AC disconnect switch have easy access from all angles to the terminal block and the terminal lugs of the terminal block. A case with a cover that only opens 90 degrees may often limit easy access to the terminal lugs of the terminal block. In addition, to facilitate wiring, the wiring from the air-conditioner compressor is often provided in the form of a wire harness which has it ends precut to a uniform length and stripped. In order to easily accommodate the preformed wiring harnesses, the terminal lugs should be aligned across the transverse direction of the AC disconnect switch case so that further cutting and stripping of the wires prior to installation is not required.

In addition, side opening AC disconnect switches may be mounted so that the location will not accommodate the opening of the cover in one direction. Therefore, an installer may have to maintain an inventory of AC disconnect switches that have both of left-hand opening covers and right-hand opening covers to accommodate particular installation locations.

The prior art also discloses AC disconnect switches with a locking mechanism to maintain the cover in a closed position on the case. One particular mechanism disclosed by the prior art is a protruding hasp attached to the case and engaging a slot in the cover. In the prior art, the protruding hasp is an impediment to packaging the AC disconnect switch in a rectangular box and thereby increases shipping volume.

In addition to the installation and drawbacks outlined above, the prior art AC disconnect switches are often unnecessarily complicated in their construction, requiring multiple screws for attaching the terminal block to the case and for attaching the cover to the case.

SUMMARY OF THE INVENTION

The present invention solves the above problems by providing an AC disconnect switch with an enclosure that provides improved access to the terminal block for the installer, improved adaptability to inaccessible installation locations, an improved locking mechanism, and simplified construction. In one embodiment of the present invention with a top opening cover, the case of the AC disconnect switch has portions of its side walls removed thereby exposing the sides of the terminal block for easier access. The AC disconnect switch has a cover that is hinged at the top of the case and opens at an angle greater than 180 degrees to further enhance installation access. In that same embodiment, the cover is provided with a detent mechanism that holds the cover open during wiring installation to further insured easy access for the installer. The AC disconnect switch further has the terminal lugs on the terminal block aligned in the transverse direction of the enclosure case to accommodate precut and prestripped wiring harnesses. The terminal lugs have roughened contact surfaces to insure good electrical contact between the terminal lugs and the wire. The terminal block is mounted to the case by a unique tab arrangement which requires only a single screw, the required ground screw, for installation of the terminal block within the case. The pullout handle assembly has a folding handle which minimizes the depth required for the case of the AC disconnect switch. Moreover, a locking mechanism has a retractable hasp at the bottom of the case that minimizes the shipping volume for the AC disconnect switch.

In a second embodiment of the present invention, the cover is hinged on the side of the case. The hinge arrangement requires no screws and instead snaps on and off the case. Consequently, the hinge arrangement allows for the cover to be hinged for either left-hand opening or for right-hand opening. Like the first embodiment, the second embodiment further has a single screw mounted terminal block with inline terminal lugs, roughened terminal lug contact surfaces, a folding handle to minimize depth, and a folding hasp to minimize shipping volume.

Therefore, it is an object of the present invention to provide an AC disconnect switch with an enclosure that provides improved access to the terminal block for the installer, improved adaptability to inaccessible installation locations, an improved locking mechanism, and simplified construction.

Further objects, features, and advantages will become apparent upon consideration of the following detailed description of the invention when taken in conjunction with the drawing and the appended claims.

BRIEF DESCRIPTION OF THE DRAWINGS

FIG. 4 is a cross section view of the first embodiment of the AC disconnect switch in accordance with the present invention as seen along line 4—4 of FIG. 2 with the cover closed and the terminal block removed.

FIG. 7 is a perspective view of the pullout handle assembly in accordance with the present invention.

FIG. 8 is a cross section view, similar to FIG. 4, of the first embodiment of the AC disconnect switch in accordance with the present invention showing the terminal block mounted within the case of the AC disconnect switch.

DETAILED DESCRIPTION OF THE PREFERRED EMBODIMENT

Figure 1:
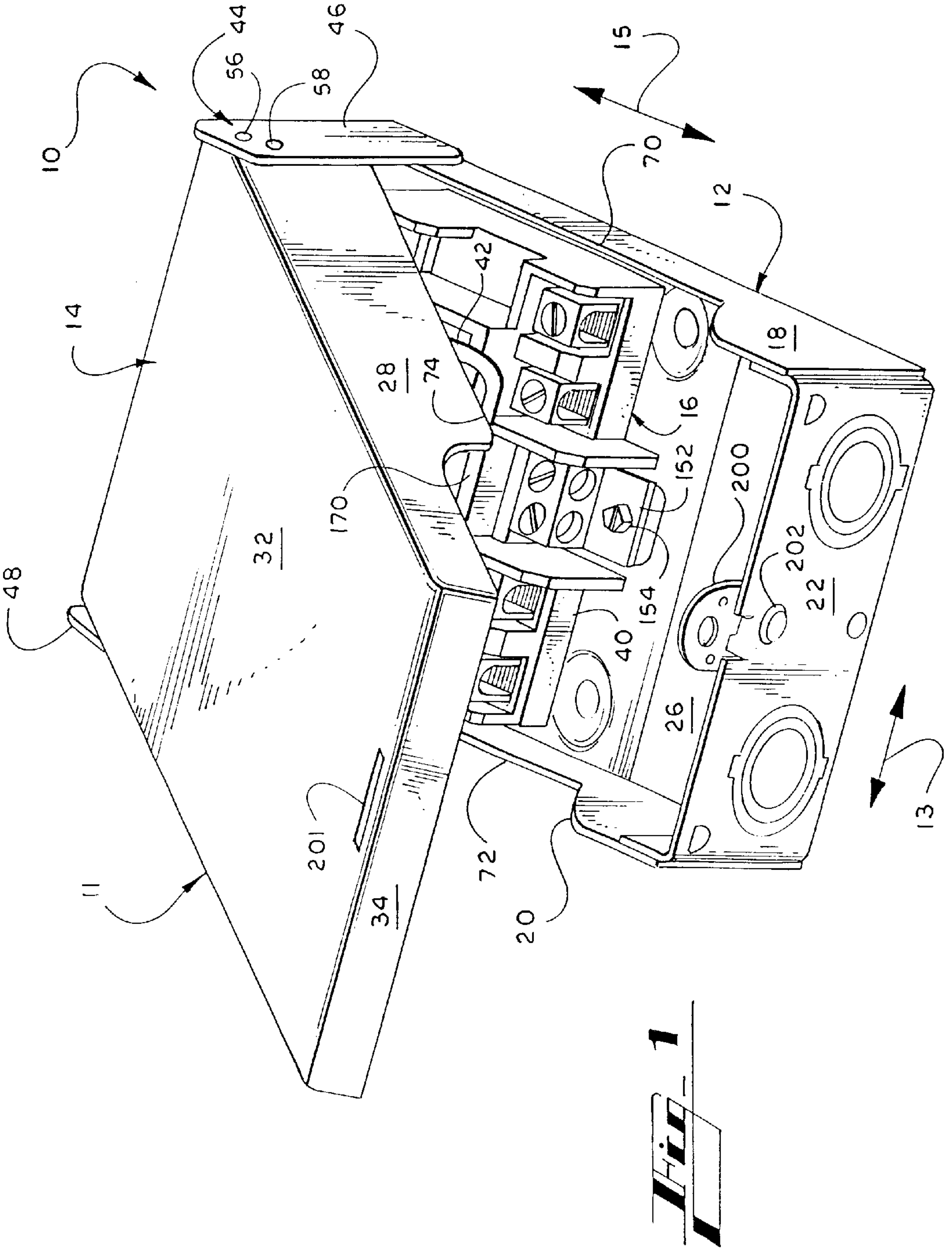
FIG. 1 is a perspective view of a first embodiment of an AC disconnect switch with top hinges in accordance with the present invention.

Referring now to the drawings, in which like reference numerals represent like parts throughout the several views, FIGS. 1 through 9 discloses a first embodiment of an AC disconnect switch 10 with a top hinged cover comprising an enclosure 11 and a terminal block assembly 16. The enclosure 11 comprises a case 12 with a cover 14. The terminal block assembly 16 comprises a plastic terminal block 40 and a pullout handle assembly 42. The terminal block assembly 16 is mounted within the case 12. The AC disconnect switch enclosure 11 has a transverse direction 13 and a longitudinal direction 15.

Figure 2:
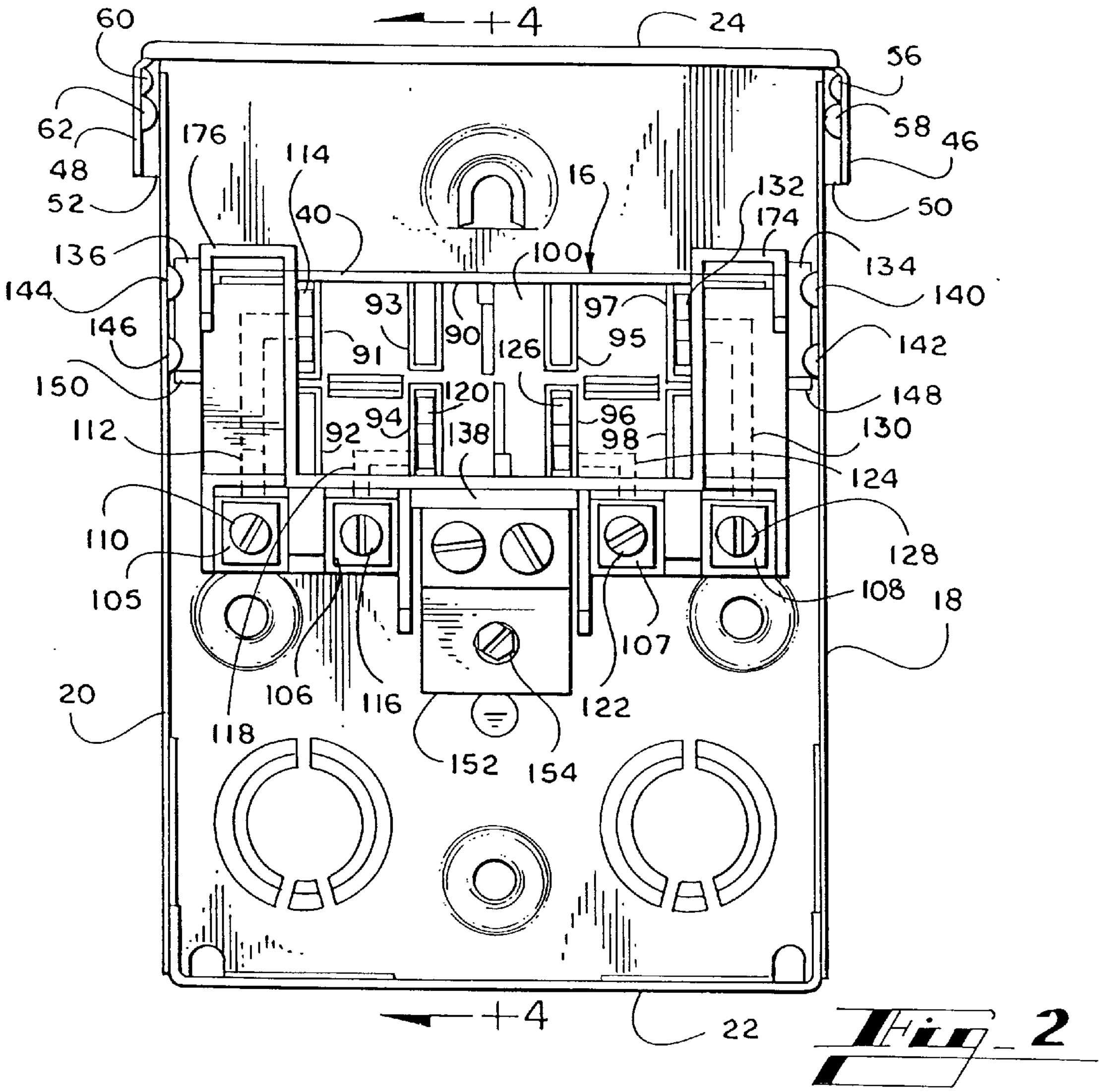
FIG. 2 is a front elevation view of the first embodiment of the AC disconnect switch (with the cover and the plastic shield removed) in accordance with the present invention.
Figure 3:
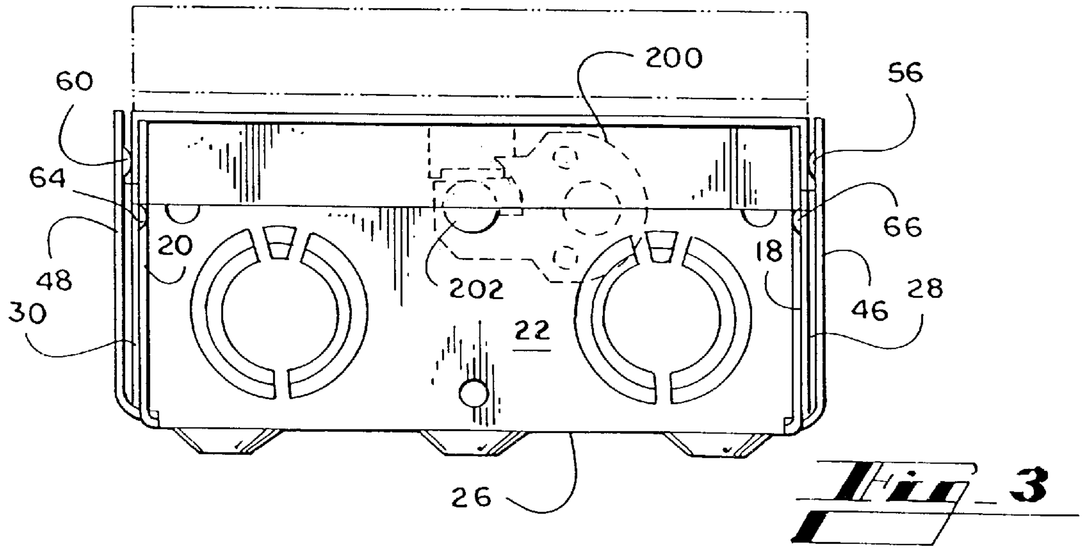
FIG. 3 is a top plan view of the first embodiment of the AC disconnect switch in accordance with the present invention.
Figure 5:
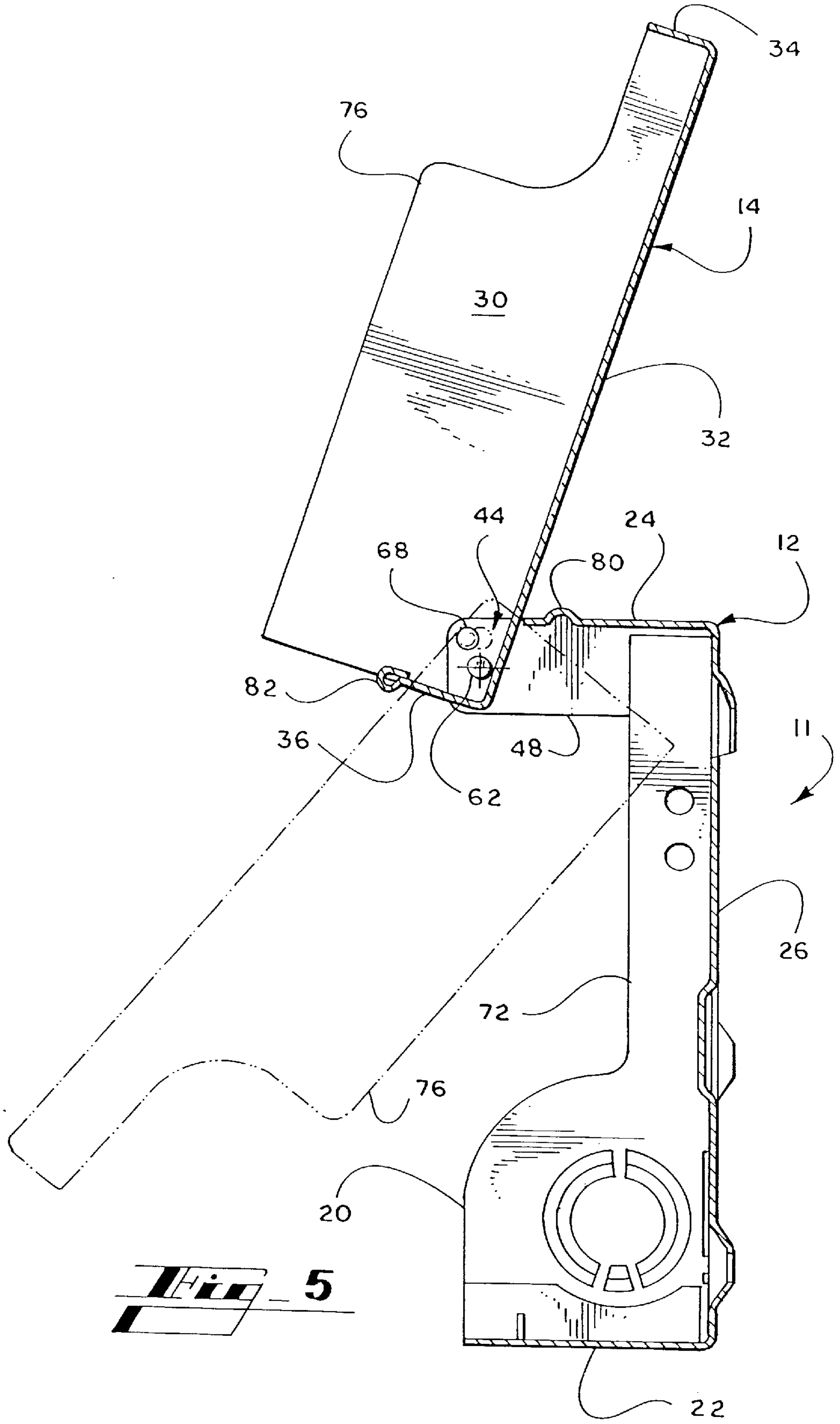
FIG. 5 is a cross section view, similar to FIG. 4, of the first embodiment of the AC disconnect switch in accordance with the present invention with the cover opened.
Figure 9:
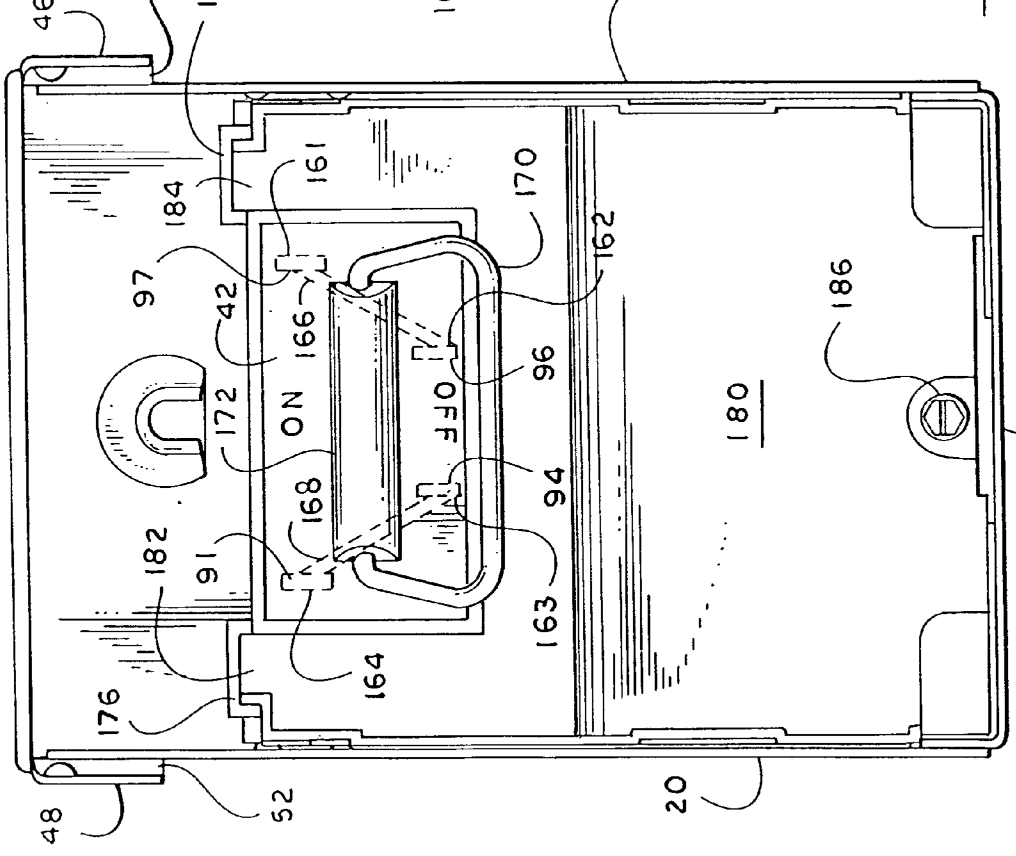
FIG. 9 is a front elevation view of the first embodiment of the AC disconnect switch in accordance with the present invention with the plastic shield installed and the pullout handle assembly in place.
Figure 8A:
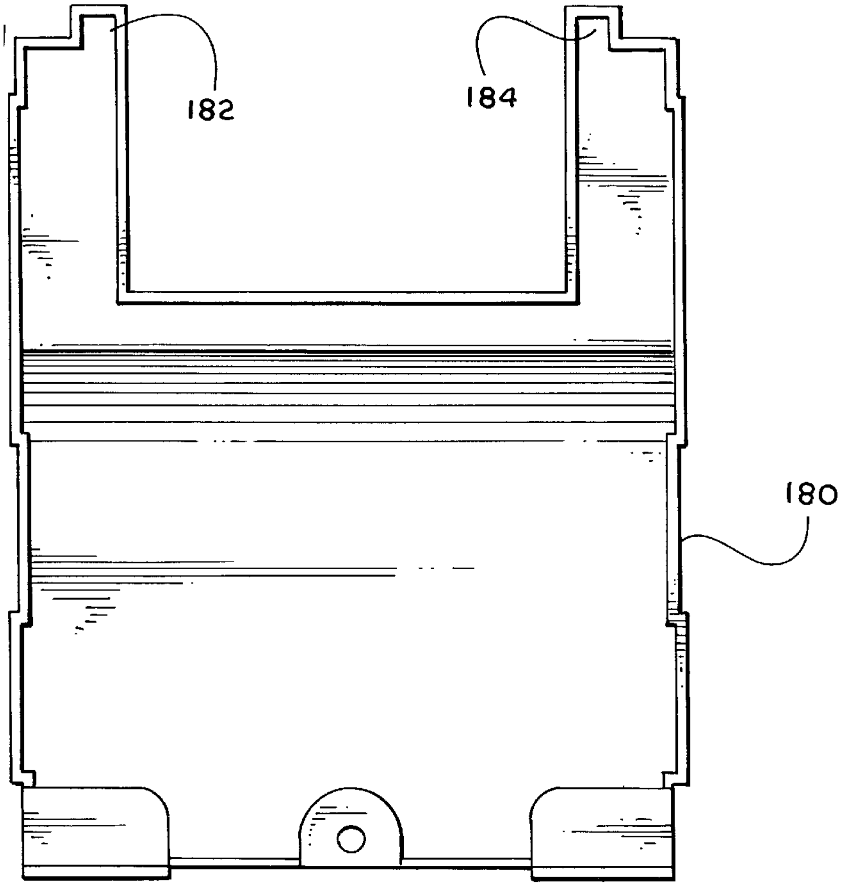
FIG. 8A is a front elevation view of the plastic shield incorporated into both embodiment of the AC disconnect switch in accordance with the present invention.

The case 12 has side walls 18 and 20, bottom wall 22, top wall 24, and back wall 26. The cover 14 has side walls 28 and 30, front wall 32, bottom wall 34, and top wall 36. The cover 14 is hinged by means of a hinge assembly 44 to the case 12 adjacent the top wall 36 of the cover 14 and the top wall 24 of the case 12. The hinge assembly 44 includes stationary members 46 and 48 that wrap around the side walls 18 and 20 respectively to form channels 50 and 52 (FIGS. 2 and 9). As shown in FIGS. 2 and 3, dimples 56, 58, 60, and 62 are formed in members 46 and 48 and extend into channels 50 and 52. Likewise, dimples 64 and 66 are formed in cover side walls 30 and 28 respectively (FIG. 3). As shown in FIGS. 4 and 5, the dimple 64 in cover side wall 30 engages matching dimple 62 in stationary member 48, and likewise dimple 66 in cover side wall 28 engages matching dimple 58 in stationary member 46. The matching dimples thus form the hinge mechanism 44 for the cover 14 and define the pivot axis for the rotation of the cover 14. The cover side walls 28 and 30 also have detent dimples, such as dimple 68 in cover side wall 30 (FIG. 5). Dimple 68 engages dimple 60 to hold the cover 14 in its open position. Because the case top wall 24 does not extend forward as far as the pivot axis 62 (FIG. 5) of the cover 14, the cover 14 can rotate greater than 180 degrees as shown in FIG. 5 to allow easy access to the inside of the case 12. In addition, the detent mechanism of dimples 60 and 68 (FIG. 5) hold the cover 14 in the open position while an electrician wires the AC disconnect switch 10.

Referring to FIG. 5, the top wall 24 of the case 12 has a groove 80 extending along the transverse direction 13. The top wall 36 of the cover 14 has a matching lip 82 extending along the transverse direction 13. As can be seen in FIGS. 4 and 8, the lip 82 engages the groove 80 to form a water seal along the top of the enclosure 11.

Figure 19A:
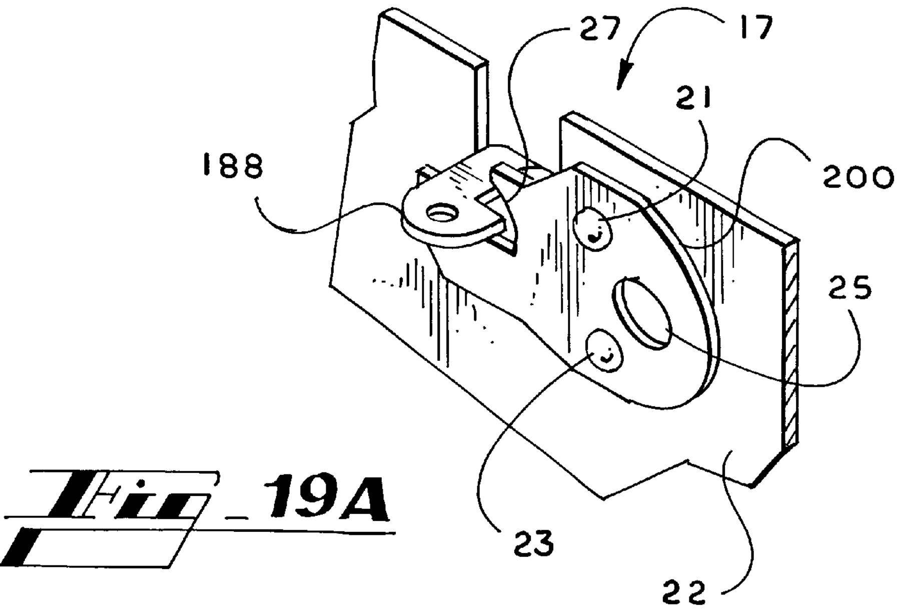
FIG. 19A is a detailed perspective view of the retractable hasp, in the retracted position, used with both embodiments of the AC disconnect switch in accordance with the present invention.
Figure 19B:
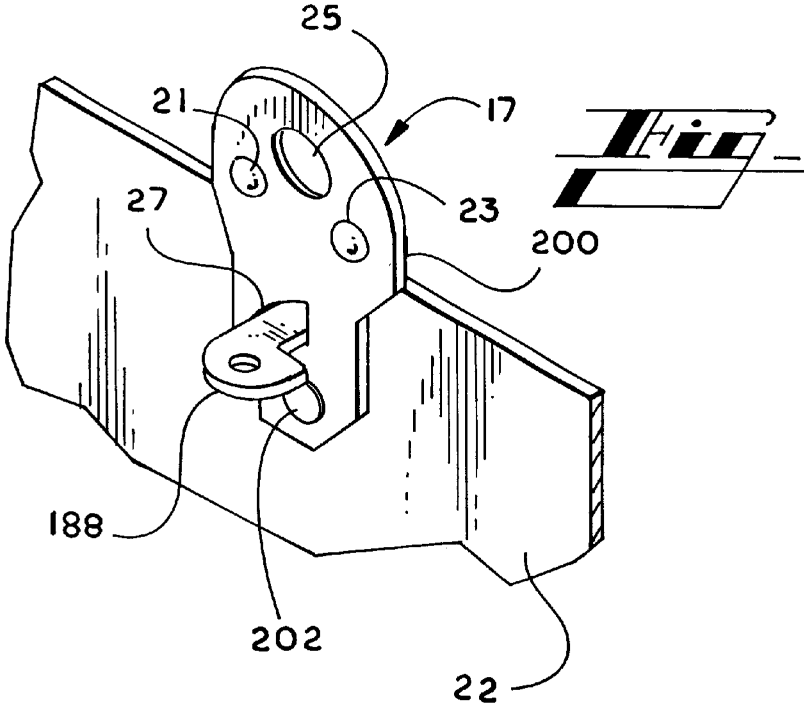
FIG. 19B is a detailed perspective view of the retractable hasp, in the extended position, used with both embodiments of the AC disconnect switch in accordance with the present invention.

Referring to FIGS. 1, 3, 4, 19A, and 19B, the cover 14 is locked to the case 12 in the closed position by means of the locking mechanism 17. The locking mechanism 17 comprises a retractable hasp 200, which is pivotally attached to the bottom wall 22 by means of a pivot pin 202. The hasp 200 further has dimples 21 and 23, an arcuate slot 27, and a hole 25. The bottom wall 22 of the case 12 has a threaded standoff 188 as best seen in FIGS. 19A and 19B. The hasp 200 rotates about the pivot pin 202 from its retracted position shown in FIG. 19A to its extended position shown in FIG. 19B. As the hasp 200 rotates into the extended position (FIG. 19B), the arcuate slot 27 engages the standoff 188 to stabilize the hasp 200 in the extended position. The dimples 21 and 23 serve to engaged the edge of the bottom wall 22 to hold the hasp 200 in its extended position. With the hasp 200 in its extended position (FIGS. 1 and 4), the hasp 200 engages a slot 201 in the cover 14, and a padlock or other lock can be inserted through hole 25 to secure the cover 14 to the case 12. The retracted position allows the AC disconnect switch to fit into a smaller shipping box and thus reduce shipping volume.

The side walls 18 and 20 of case 12 have cut away sections 70, and 72. The side walls 28 and 30 of cover 14 have matching protruding sections 74 and 76. The cut away sections 70 and 72 of case 12 provide improved access to the inside of the case 12 when the cover 14 is opened. The matching protruding sections 74 and 76 of cover side walls 28 and 30 cover the side wall cut away sections 70 and 72 when the cover 14 is closed.

Figure 6:
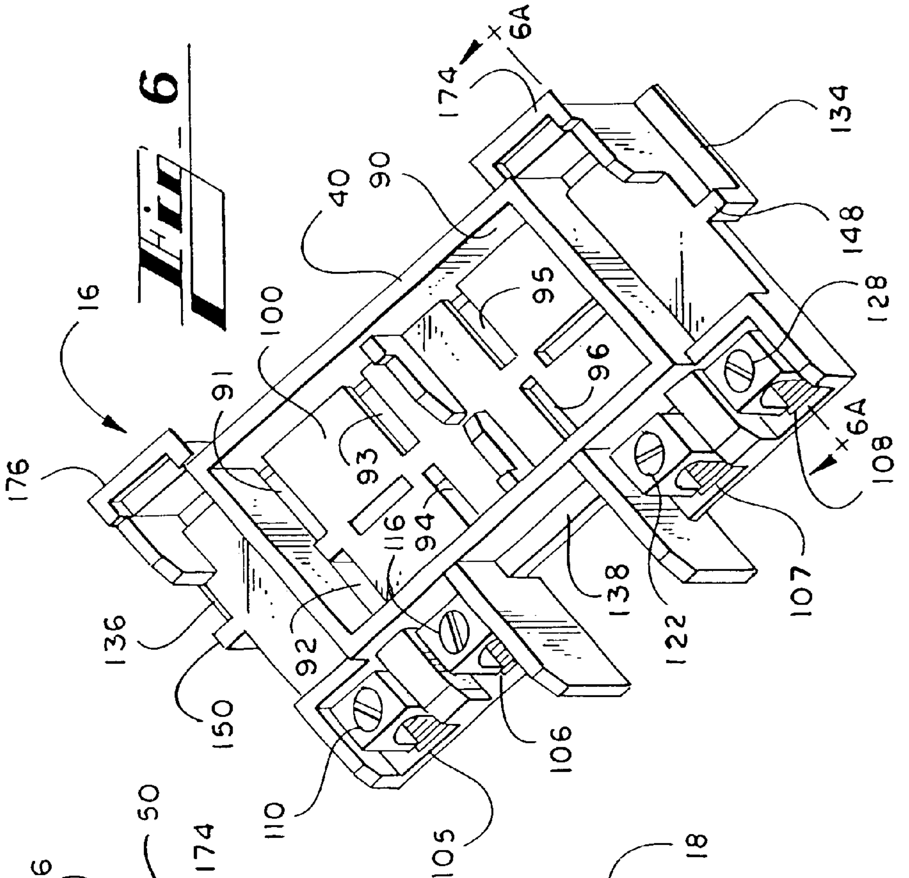
FIG. 6 is a perspective view of the molded terminal block in accordance with the present invention.
Figure 6A:
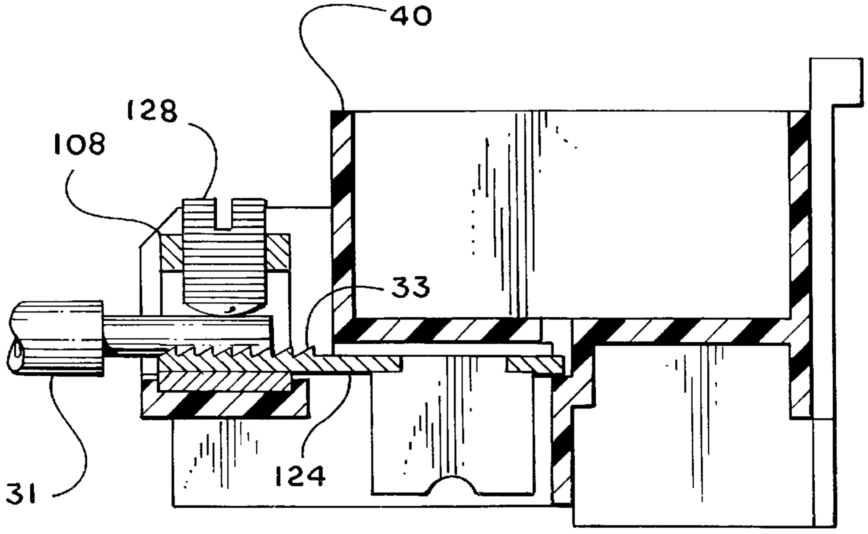
FIG. 6A is a cross section view of one of the terminal lugs of the molded terminal block of the AC disconnect switch in accordance with the present invention as seen along line 6A—6A of FIG. 6.
Figure 10:
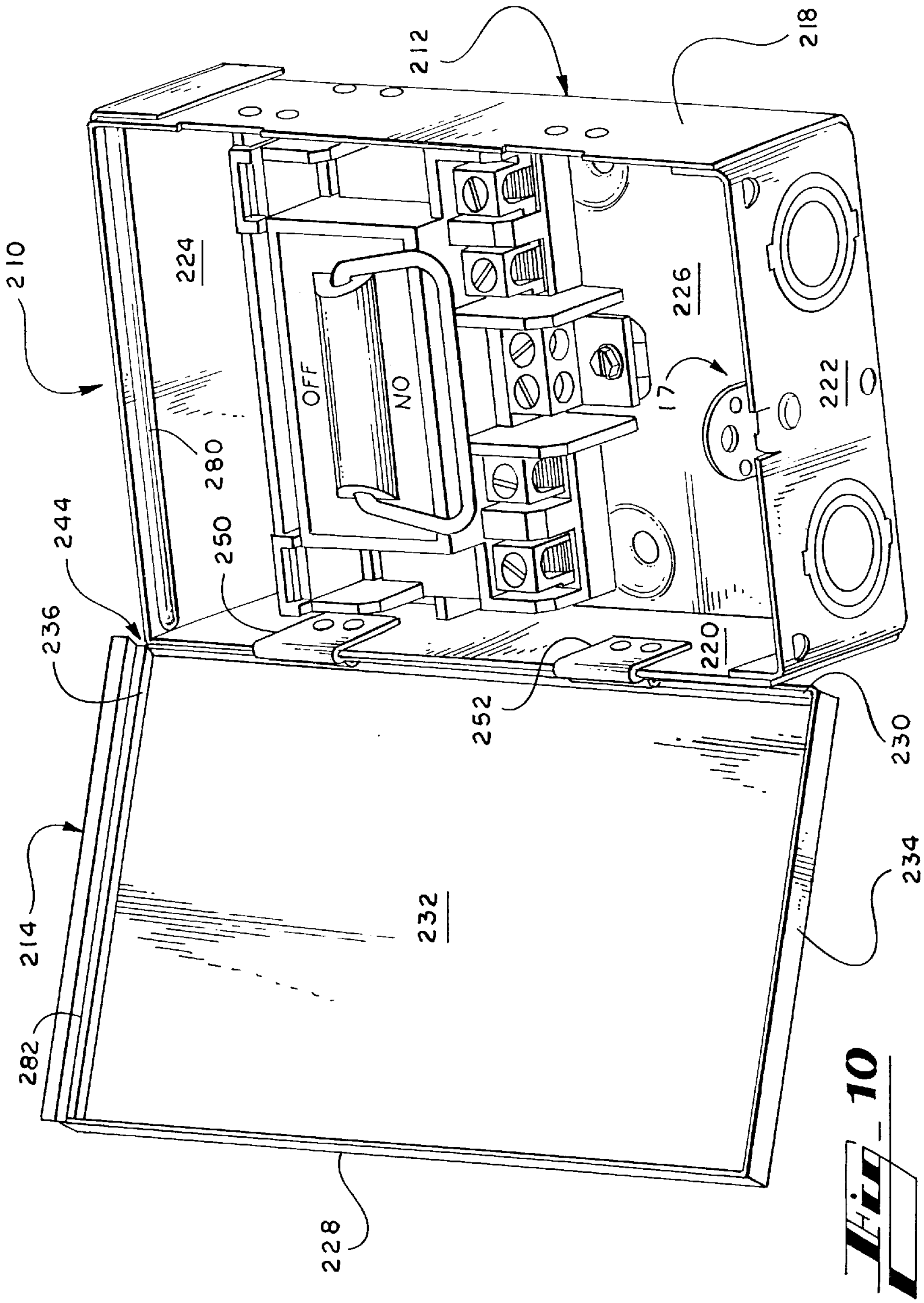
FIG. 10 is a perspective view of a second embodiment of the AC disconnect switch in accordance with the present invention with side hinges.
Figure 12:
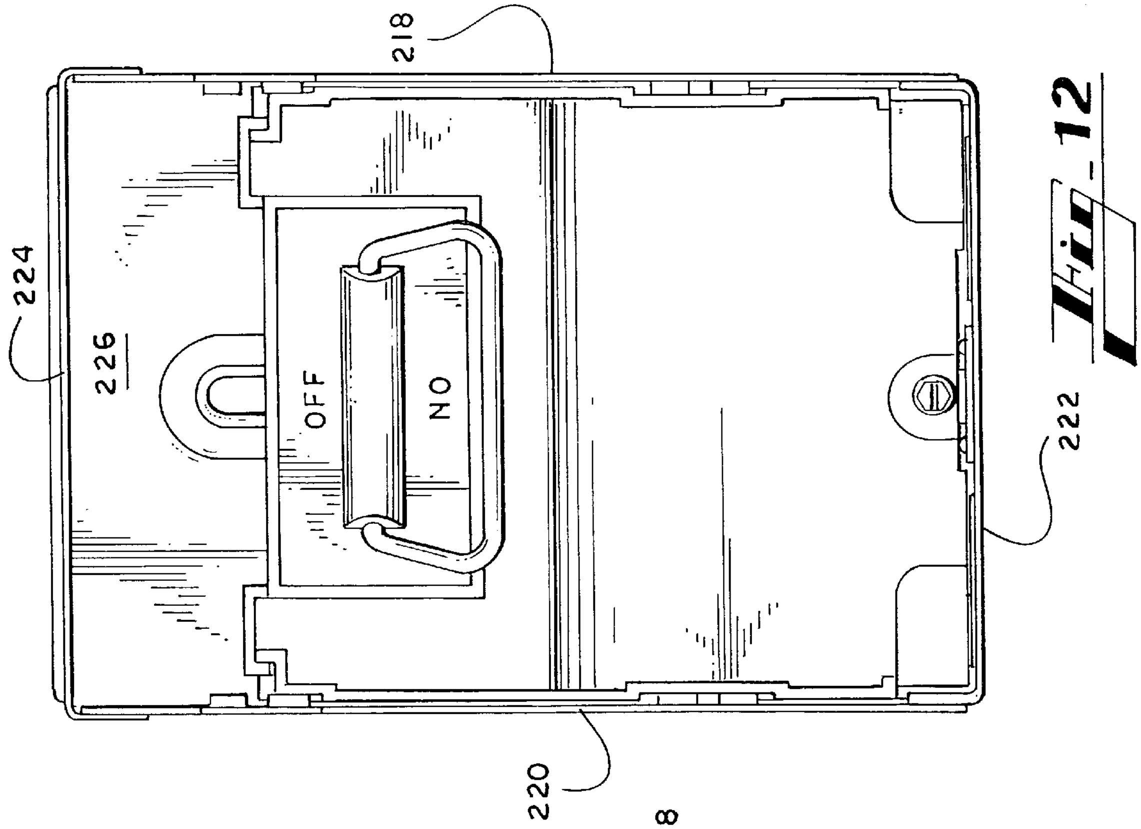
FIG. 12 is a front elevation view of the second embodiment of the AC disconnect switch in accordance with the present invention with the shield and the pullout handle assembly installed.
Figure 11:
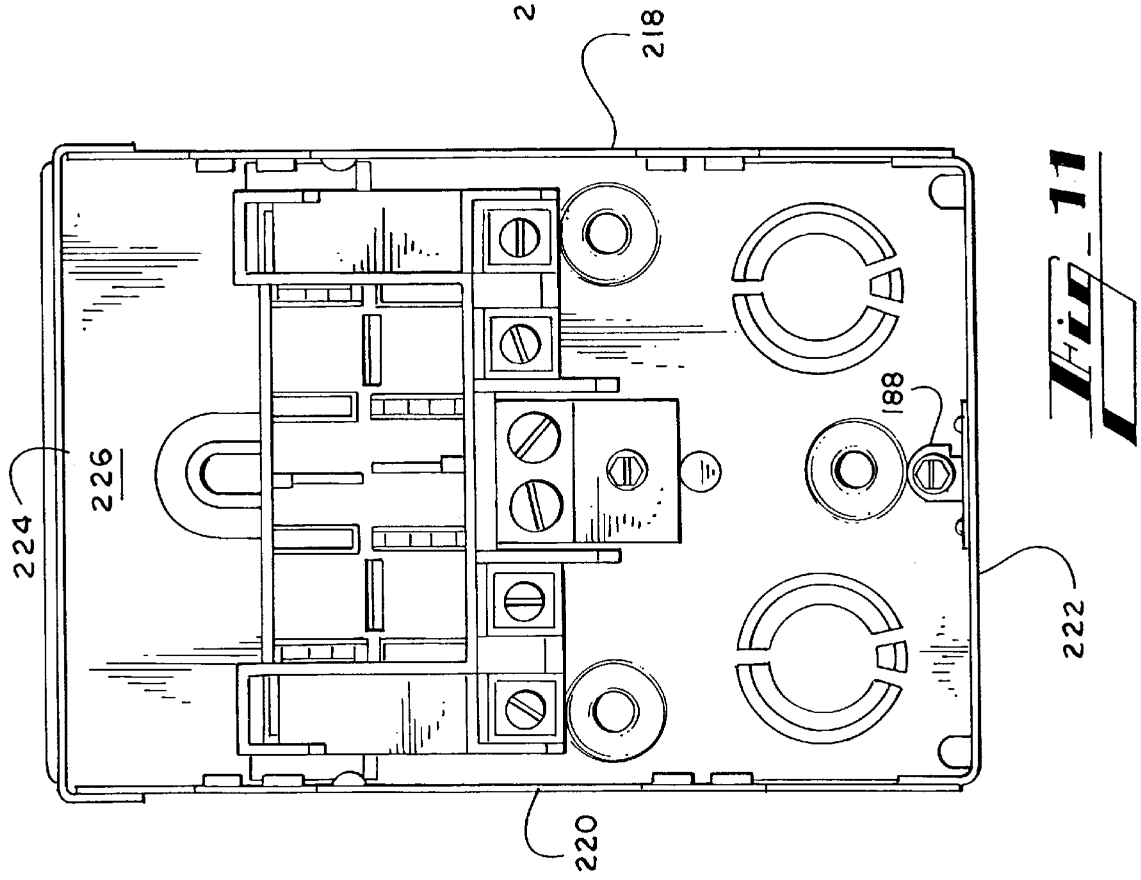
FIG. 11 is a front elevation view of the second embodiment of the AC disconnect switch in accordance with the present invention with the shield and the pullout handle assembly removed.
Figure 13:
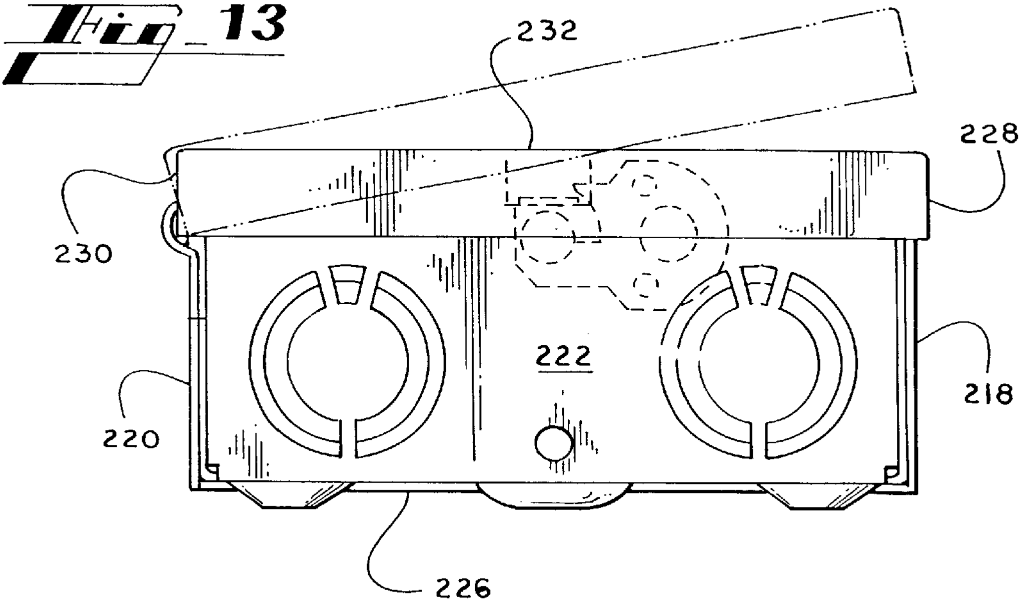
FIG. 13 is a bottom plan view of the second embodiment of the AC disconnect switch in accordance with the present invention with the hasp of the locking mechanism retracted.
Figure 14:
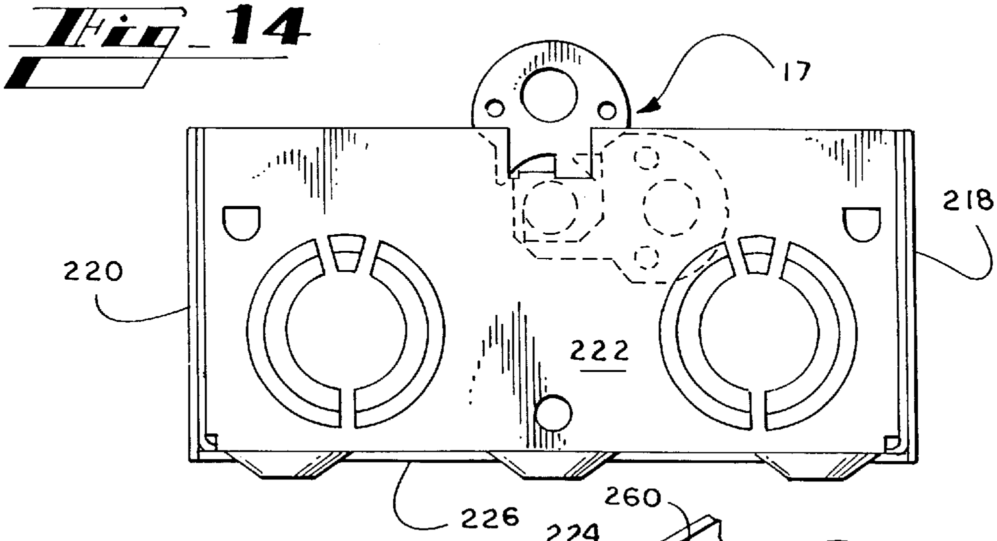
FIG. 14 is a bottom plan view of the second embodiment of the AC disconnect switch in accordance with the present invention with the hasp of the locking mechanism extended.

The terminal block assembly 16 includes the molded plastic terminal block 40 (FIG. 6) and the pullout handle assembly 42 (FIG. 7). The terminal block 40 has a rectangular receptacle 90 for receiving the pullout handle assembly 42. The terminal block also has slots 91, 92, 93, 94, 95, 96, 97, and 98 in the base 100 of the receptacle 90. Terminal lugs 105, 106, 107, and 108 are press fit into the terminal block 40. Each terminal lug has a set screw, a connector, and a stab. As shown in FIGS. 2 and 6, terminal lug 105 has a set screw 110, a connector 112, and a stab 114 located within slot 91. Terminal lug 106 has a set screw 116, a connector 118, and a stab 120 located within slot 94. Terminal lug 107 has a set screw 122, a connector 124, and a stab 126 located within slot 96. Terminal lug 108 has a set screw 128, a connector 130, and a stab 132 located within slot 97. With reference to FIG. 6A, a detail of terminal lug 108 is shown. The connector 124 of the terminal lug 108 has a roughened surface 33. The set screw 128 captures a wire 31 against the roughened surface 33 to ensure good electrical contact and to securely hold the wire 31 from being pulled out of the terminal lug 108.

Returning to FIG. 6, the terminal block 40 has side hold down tabs 134 and 136 and front hold down tab 138. As can be seen in FIGS. 2 and 8, dimples 140 and 142 and dimples 144 and 146 are formed in the case side walls 18 and 20, respectively. The side hold down tabs 134 and 136 slide under dimples 140 and 142 and dimples 144 and 146, respectively. The dimples 142 and 146 abut stops 148 and 150 to limit movement of the terminal block 40 in the longitudinal direction 15 toward the top wall 24 of the case 12. A ground terminal lug 152 (FIG. 2) engages the front hold down tab 138 and is connected to the back wall 26 of the case 12 by means of a single terminal block screw 154.

Turning to FIG. 7, the pullout handle assembly 42 has knife blades 161, 162, 163, and 164. The knife blades are aligned to mate with the pattern for slots 91, 92, 93, 94, 95, 96, 97, and 98 in the terminal block 40. Knife blades 161 and 162 are electrically connected by connector 166, and knife blades 163 and 164 are electrically connected by connector 168. FIG. 9 shows the pullout handle assembly 42 installed in the receptacle 90 of the terminal block 40 in the "on" position. In the "on" position, the knives 164 and 163 engage stabs 91 and 94 to connect the line and load on one side to the terminal block 40. Likewise, in the "on" position, the knives 161 and 162 engage stabs 97 and 96 to connect the line and load on the other side to the terminal block 40. In order to disconnect the line from the load, the pullout handle assembly 42 is pulled out of the receptacle 90, rotated 180 degrees, and reinserted so that the knives 161, 162, 163, and 164 engage empty slots 92, 93, 95, and 98 (FIG. 2). The pullout handle assembly 42 has indices "on" and "off" imprinted on its face to indicate to the installer whether the pullout handle assembly 42 is inserted with the circuit on or off.

Turning to FIG. 9, the pullout handle assembly 42 has a handle bracket 172 with holes at each end. A folding handle 170 comprises a wire bent in the shape of a "C". The ends of the handle 170 engage the holes in the bracket 172 so that the handle 170 can pivot from an extended gripping position to a retracted storage position as shown in FIG. 9 in order to minimize the depth required for the case 12.

FIGS. 1 and 2 show the terminal block assembly 16 mounted in the case 12. The terminal set screws 110, 116, 122, and 128 are aligned in the transverse direction 13. Consequently, a precut and prestripped wiring harness can be connected to the terminal lugs without recutting or restripping the wires. Once the terminal block assembly 16 is in place as shown in FIGS. 1 and 2, a plastic shield 180 is placed over the terminal block assembly 16 to preclude contact by an installer with the terminal lugs 105, 106, 107, and 108 when the cover 14 is opened. The plastic shield 180 is held in place by means of buckles 174 and 176 located on the terminal block 40 (FIG. 6). The plastic shield 180 (FIG. 8A) has matching tabs 184 and 182 which engage the buckles 174 and 176 from the bottom. A shield screw 186 engages the threaded standoff 188 on the bottom wall 22 of the case 12 and thereby holds the plastic shield 180 in place.

A second embodiment of the invention is shown in FIGS. 10 through 18. The second embodiment of the AC disconnect switch 210 is similar to the first embodiment except for the construction of the case 212, the cover 214, and the hinge assembly 244. Particularly, in the second embodiment of AC disconnect switch 210, the case 212 has side walls 218 and 220, bottom wall 222, top wall 224, and back wall 226. The cover 214 has side walls 228 and 230, front wall 232, bottom wall 234, and top wall 236. The cover 214 is hinged by means of a hinge assembly 244 to the case 212 adjacent the cover side wall 230 and the case sidewall 220. The hinge assembly 244 includes hinges 250 and 252. The hinge 250 and 252 are identical, and for convenience only the hinge 250 will be described. The hinge 250 includes a hinge clip 260, a slot 262 in cover side wall 230, and mounting protrusions 264 and 266 on case side wall 220. The hinge clip 260 is U-shaped and has legs 270 and 272 that held together by the resilient nature of the material from which the hinge clip is formed. Leg 270 has a transverse channel 275. Leg 272 has holes 274 and 276.

Figure 15:
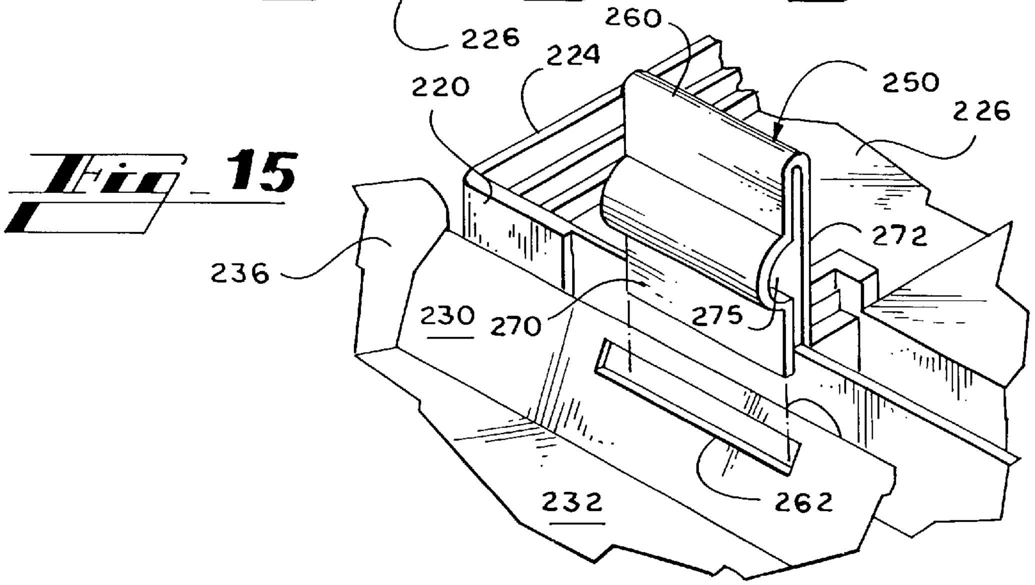
FIG. 15 is a detailed perspective view of hinge clips used with the second embodiment of the AC disconnect switch in accordance with the present invention.
Figure 16:
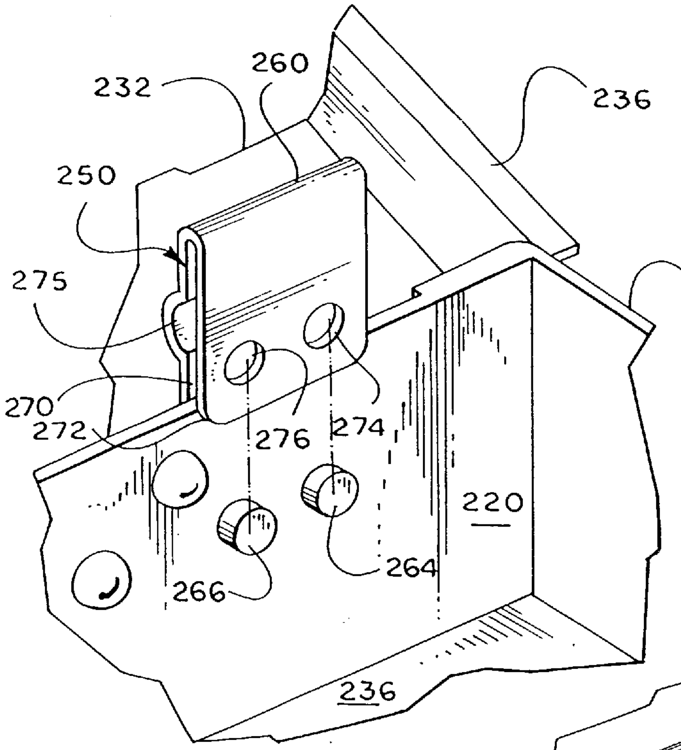
FIG. 16 is a detailed perspective view of hinge clips used with the second embodiment of the AC disconnect switch in accordance with the present invention.
Figure 17:
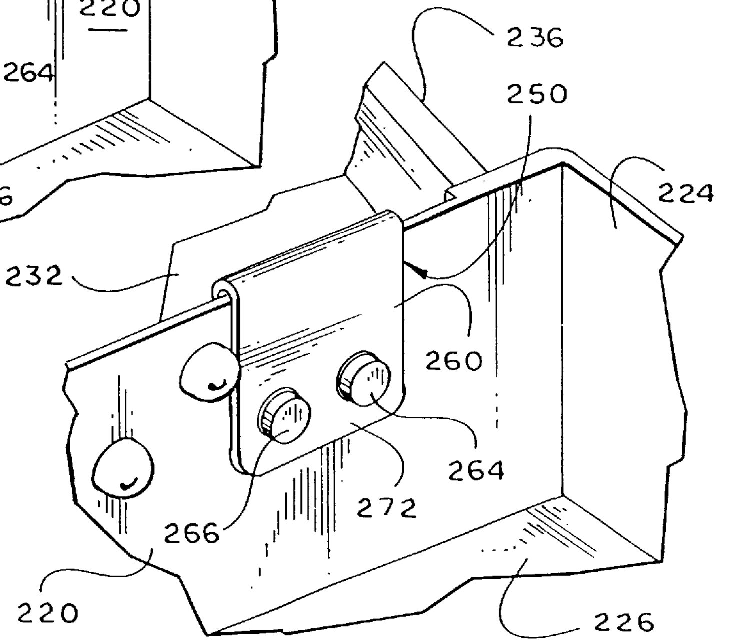
FIG. 17 is a detailed perspective view of hinge clips used with the second embodiment of the AC disconnect switch in accordance with the present invention.
Figure 18:
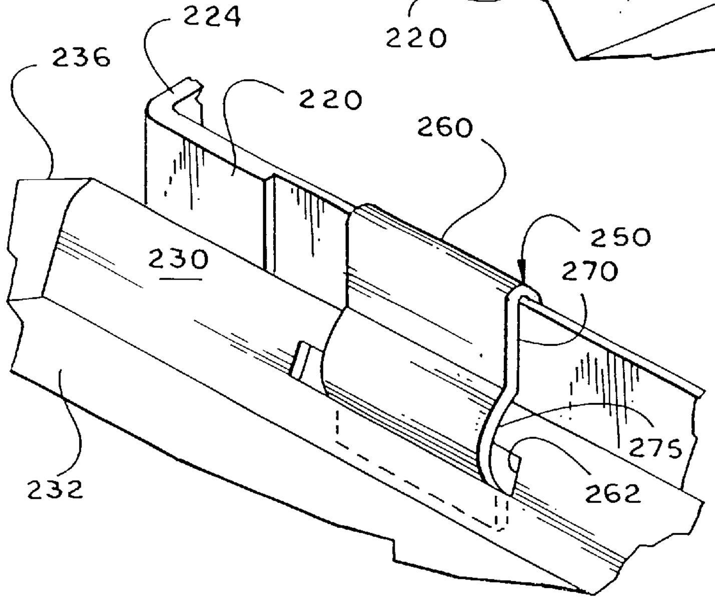
FIG. 18 is a detailed perspective view of hinge clips used with the second embodiment of the AC disconnect switch in accordance with the present invention.

The installed hinge 250 is shown in FIGS. 17 and 18. The leg 270 with channel 275 engages slot 262 of cover side wall 230 to provide the pivot mechanism for the hinge 250. The leg 272 is mounted to the case side wall 220 by means of the holes 274 and 276 engaging the protrusions 264 and 266. The hinge 250 is assembled as shown in FIGS. 15 and 16. First, the slot 262 of cover 214 is aligned with the protrusions 264 and 266. The hinge clip 260 is then positioned as shown in FIGS. 15 and 16. The leg 270 of the hinge clip 260 is then inserted into the slot 262 of the cover side wall 230. The hinge clip 260 is then pushed down onto the case side wall 220 and the legs are spread until the holes 274 and 276 engage the protrusions 264 and 266.

By providing slots, such as slot 262, in both side walls 228 and 230 of the cover 214 and by providing protrusions, such as protrusions 264 and 266, in both side walls 218 and 220 of the case 212, the cover 214 can be hinged by means of the hinge clip on either the right or left hand side of the case 212. Consequently, the second embodiment of the AC disconnect switch 210 provides a reversible door hinge to accommodate a locations which may limit access from one side or the other.

The top wall 224 of the case 212 has a groove 280 extending along the transverse direction 13. The top wall 236 of the cover has a matching lip 282 extending along the transverse direction 13. When the cover 214 is closed, lip 282 engages the groove 280 to form a water seal along the top of the case 212. In order for the lip 282 to override the groove 280 when the cover 214 is closed, the hinges, such as hinge 250 provides for longitudinal movement of the cover 214 with respect to the case 212. The longitudinal movement is provided by the slots, such as slot 262, being longer than the width of the legs, such as leg 270 (FIG. 18). The length of the slots allows the cover 214 to move in the longitudinal direction 15 with respect to the case 212.

While this invention has been described with reference to preferred embodiments thereof, it is to be understood that variations and modifications can be affected within the spirit and scope of the invention as described herein and before and as described in the appended claims.

We claim:

1. An AC disconnect switch comprising:

a. an enclosure comprising:

i. a case having a back wall, a top wall, a bottom wall, and side walls wherein the side walls have cut away sections with a height less than the height of the top wall or the bottom wall of the case;

ii. a cover having a front wall, a top wall, a bottom wall, and side walls, where in the cover side walls have protruding sections with a height greater than the height of the top wall or the bottom wall of the cover wherein the protruding sections of the cover cover the cut away sections of the case when the cover is closed; and iii. a hinge mounted on the top of the case for connecting the cover to the case; and b. a terminal block assembly mounted in the case adjacent the cut away sections to provide access to the terminal block through the cut away sections.

2. The AC disconnect switch claim 1, wherein the terminal block has a thickness, and the height of the cut away sections of the side walls of the case is less than the thickness of the terminal block.

3. The AC disconnect switch of claim 1, wherein the hinge comprises matching detents and dimples on the side walls of the case adjacent the top wall of the case and wherein the height of the top wall of the case is less than the height of the side walls of the case adjacent the top wall of the case so that when the cover is opened, the cover can rotate greater than 180 degrees.

4. The AC disconnect switch of claim 3, wherein each of the side walls of the cover has a second detent adjacent to the matching detents and dimples and each of the second detents engages the side walls of the case when the cover is in an open position to hold the cover in the open position.

5. The AC disconnect switch of claim 1, wherein the top wall of the cover and the top wall of the case have a matching lip and groove so that when the cover is in the closed position, the groove engages the lip to seal the enclosure.

6. The AC disconnect switch of claim 1, wherein the case includes a locking mechanism with a retractable hasp attached to the case.

7. The AC disconnect switch of claim 1, wherein the switch comprises:

a. the terminal block assembly connected to the case comprising;

i. an insulating terminal block having a receptacle formed therein;

ii. stabs positioned within the receptacle;

iii. terminal lugs connected to the stabs wherein all of the terminal lugs are aligned across the transverse dimension of the case;

b. a pullout handle assembly for receipt in the receptacle of the insulating block and comprising:

i. a handle assembly body;

ii. a handle attached to the handle assembly body; and iii. electrically interconnected knife blades attached to the handle assembly body; and c. a plastic shield fitted over the terminal block assembly and secured to the case to cover the terminal lugs.

8. The AC disconnect switch of claim 7, wherein the handle is rotatably attached to the handle assembly body so that the handle can move between an extended gripping position and retracted storage position.

9. The AC disconnect switch of claim 7, wherein the terminal block is connected to the case by means of tabs engaging dimples on the side of the case at one end of the terminal block and a terminal block screw and ground lug engaging the back of the case at the other end of the terminal block.

10. The AC disconnect switch of claim 7, wherein each terminal lug comprises a roughened contact and an opposing set screw for engaging a wire between the roughened contact and the set screw.

11. The AC disconnect switch of claim 7, wherein the plastic shield engages the terminal block by means of buckles and tabs at one end of the plastic shield and is connected to the case at the other end of the plastic shield by means of a shield screw.

12. An AC disconnect switch comprising:

a. an enclosure comprising;

i. a case having a back wall, a top wall, a bottom wall, and side walls, wherein each side wall of the case has hinge engaging protrusions;

ii. a cover having a front wall, a top wall, a bottom wall, and side walls, wherein each side wall of the cover has hinge engaging slots;

iii. separate hinge clips for connecting the cover to the case wherein each hinge clip has a first leg for extending over the side walls of the case to engage the protrusions and a second leg having a concave portion for engaging the slots in the side walls of the cover so that the cover can rotate about the concave portions of the hinge clip; and b. a terminal block assembly mounted in the case.

13. The AC disconnect switch of claim 12, wherein the top wall of the case has an lip and the top wall of the cover has a matching groove, and the slots in the side walls of the cover are longer than the width of the hinge clips so that the cover can slide longitudinally with respect to the case to allow the groove in the cover to override the lip on the case when the cover is closed to create a seal between the top wall of the case and the top wall of the cover.

14. The AC disconnect switch of claim 12, wherein the case includes a locking mechanism with a retractable hasp attached to the case.

15. The AC disconnect switch of claim 12, wherein the switch comprises a. the terminal block assembly comprising;

i. an insulating terminal block having a receptacle formed therein;

ii. stabs positioned within the receptacle;

iii. terminal lugs connected to the stabs wherein all of the terminal lugs are aligned across the transverse dimension of the case;

b. a pullout handle assembly for receipt in the receptacle of the insulating block and comprising:

i. a handle assembly body;

ii. a handle attached to the handle assembly body; and iii. electrically interconnected knife blades attached to the handle assembly body; and c. a plastic shield fitted over the terminal block assembly and secured to the case to cover the terminal lugs.

16. The AC disconnect switch of claim 15, wherein the handle is rotatably attached to the handle assembly body so that the handle can move between an extended gripping position and retracted storage position.

17. The AC disconnect switch of claim 15, wherein the terminal block is connected to the case by means of tabs engaging dimples on the side of the case at one end of the terminal block and a terminal block screw and ground lug engaging the back of the case at the other end of the terminal block.

18. The AC disconnect switch of claim 15, wherein each terminal lug comprises a roughened contact and an opposing set screw for engaging a wire between the roughened contact and the set screw.

19. The AC disconnect switch of claim 15, wherein the plastic shield engages the terminal block by means of buckles and tabs at one end of the plastic shield and is connected to the case at the other end of the plastic shield by means of a shield screw.

20. An AC disconnect switch comprising:

a. an enclosure comprising;

i. a case ii. a cover for the case mounted to the case by means of a hinge and held closed by means of a locking mechanism:

b. a terminal block assembly comprising;

i. an insulating terminal block having a receptacle formed therein;

ii. stabs positioned within the receptacle;

iii. terminal lugs connected to the stabs wherein all of the terminal lugs are aligned across the transverse dimension of the case;

c. a pullout handle assembly for receipt in the receptacle of the insulating block and comprising:

i. a handle assembly body;

ii. a handle attached to the handle assembly body; and iii. electrically interconnected knife blades attached to the handle assembly body d. a plastic shield fitted over the terminal block assembly and secured to the case to cover the terminal lugs.

21. The AC disconnect switch of claim 20, wherein the handle is rotatably attached to the handle assembly body so that the handle can move between an extended gripping position and retracted storage position.

22. The AC disconnect switch of claim 20, wherein the locking mechanism includes a retractable hasp attached to the case.

23. The AC disconnect switch of claim 20, wherein the terminal block is connected to the case by means of tabs engaging dimples on the side of the case at one end of the terminal block and a terminal block screw and ground lug engaging the back of the case at the other end of the terminal block.

24. The AC disconnect switch of claim 20, wherein each terminal lug comprises a roughened contact and an opposing set screw for engaging a wire between the roughened contact and the set screw.

25. The AC disconnect switch of claim 20, wherein the plastic shield engages the terminal block by means of buckles and tabs at one end of the plastic shield and is connected to the case at the other end of the plastic shield by means of a shield screw.

* * * * *